United States Patent [19]

Classen

[11] Patent Number: 4,606,411

[45] Date of Patent: Aug. 19, 1986

[54] SELF-PROPELLED LAWN AERATION MACHINE

[76] Inventor: Alvin T. Classen, P.O. Box 172, Norfolk, Nebr. 68701

[21] Appl. No.: 693,439

[22] Filed: Jan. 22, 1985

[51] Int. Cl.$^4$ .............................................. A01B 45/02
[52] U.S. Cl. ....................................... 172/22; 172/88; 74/522
[58] Field of Search ...................... 172/21, 22, 101, 88, 172/86, 84, 87, 89, 95, 42, 43; 74/522, 54, 44

[56] References Cited

U.S. PATENT DOCUMENTS

| 2,659,285 | 11/1953 | Burr | 172/88 |
| 2,688,907 | 9/1954 | Joy | 172/42 |
| 3,022,834 | 2/1962 | Ruka | 172/21 |
| 3,429,378 | 2/1969 | Mascaro | 172/22 |
| 3,802,513 | 4/1974 | Ploenges | 172/21 |
| 3,986,562 | 10/1976 | Killion | 172/22 |
| 4,084,642 | 4/1978 | Killion | 172/21 |
| 4,154,305 | 5/1979 | Prewett | 172/21 |

Primary Examiner—Richard J. Johnson
Attorney, Agent, or Firm—Sughrue, Mion, Zinn, Macpeak, and Seas

[57] ABSTRACT

Paired, side by side sets of upper and lower wheels are connected together and driven by jack shafts pivotally mounted at respective ends to the upper and lower wheels of each set. One common shaft rotatably mounts the upper wheels, and a second shaft mounts the lower wheels for rotation about common axes to effect driving of the upper wheels and lower wheels in unison. The jack shafts joining the upper and lower wheels, respectively, of each set, are angularly offset to achieve desired timing and rotation of the wheels in unison and the sequence in projection and retraction of tines mounted through the jack shafts to the lower wheels of each set. The arrangement insures tine entry and retraction from the ground perpendicular to the ground. It also permits doubling the RPM of the wheels to increase the force driving the tines into the turf. Machine propulsion is effected automatically as a result of driving the tines in the ground and retraction of same.

8 Claims, 9 Drawing Figures

SELF-PROPELLED LAWN AERATION MACHINE

FIELD OF THE INVENTION

This invention relates to machines for perforating turf, removing plugs and insuring admittance of air, light and water to the roots thereof.

Machines of this type conventionally employ a series of perforating spikes or tines, either solid or hollow, and a mechanism for periodically driving the tines into the turf to a predetermined distance and removing of same. In some case, the action of the tines entering the earth and being retracted therefrom functions to pull the machine across the lawn. Typically, a small internal combustion engine, such as that normally found on a power lawn mower, provides the power necessary to drive the tines into the ground and remove the same and effects self-propulsion of the machine.

Such machines have been patented over the years. Representative patents are the following:

| Patent No. | Patentee | Year Patented |
| --- | --- | --- |
| 2,056,337 | Archiblad | 1936 |
| 2,206,264 | Rose | 1940 |
| 2,223,559 | Fleming | 1940 |
| 2,229,497 | Dontje | 1941 |
| 2,302,944 | Helbig | 1942 |
| 2,347,748 | Melling | 1944 |
| 2,638,831 | Ferguson et al | 1953 |
| 2,800,066 | Cohrs et al | 1957 |
| 3,022,834 | Ruka et al | 1962 |
| 3,136,274 | Townsend | 1964 |
| 3,148,737 | Lunsford | 1964 |
| 3,429,378 | Mascaro | 1969 |
| 3,204,703 | Hansen | 1965 |
| 3,743,025 | Thatcher | 1973 |
| 3,802,513 | Ploenges | 1974 |
| 3,834,464 | Carlson et al | 1974 |
| 3,878,899 | Jones | 1975 |
| 3,889,761 | Rogers | 1975 |
| 4,084,642 | Killion | 1978 |
| 4,096,915 | Groth | 1978 |
| 4,154,305 | Prewett | 1979 |
| 4,236,582 | Hastings | 1980 |

U.S. Pat. No. 3,022,834 to Ruka et al is representative of a rather light weight tubular metal frame type machine in the form of a pushcart mounting a small internal combustion engine which utilizes a V-belt drive for a main drive shaft extending transversely across the top of the frame. A sprocket and chain drive system facilitates rotation of paired forward and after crank wheels, each bearing a pin connected crank whose lower end terminates in a tine and whose lower end is guided by a pivotable link permitting the tines to enter and to be retracted from the ground in a sequential manner.

U.S. Pat. No. 3,429,378 to Mascaro is directed to a somewhat more massive machine which employs an inverted U-shaped frame which mounts vertically upper and lower crank shafts similar to that of an automobile with the crank shafts being joined or connected by crank arms. The crank arms each mount, at their lower ends, a tine assembly including a plurality of hollow tines for punching and removing turf cores.

U.S. Pat. No. 4,084,642 to Killion teaches a low slung tubular metal frame which mounts at an upper location a transverse shaft driven in rotation and bearing a plurality of eccentrics. The eccentrics are connected, via rods pivoted to the eccentric, blocks which, in turn, threadably carry projectable and retractable tines for perforating the turf. Tubes, surrounding the blocks, function as pivotable guides to guide the reciprocation of the tines driven by the eccentrics.

U.S. Pat. No. 4,154,305 is directd to a perforating machine having a wheel supported main frame upon which mounts an internal combustion engine whose output via belt and pulley means drives upper and lower shafts which, in turn, constitute a bell crank mechanism for vertically lifting and dropping a rigid tine support platform, thereby causing the platform to move in a defined horizontal and vertical direction and to effect the penetration of the tines into the earth and removal of the same.

The patents discussed in some detail are representative of the art. The machines such as those of U.S. Pat. Nos. 4,154,305 and 3,429,378 are quite massive and therefore costly, and while the timing of the multiple tines in U.S. Pat. No. 3,429,378 is carefully controlled, it is achieved through the utilization of massive and fairly complex multiple crank shafts. Attempts to create relatively lightweight but effective machines such as those of U.S. Pat. Nos. 3,022,834 and 4,084,642 permit a more simplified drive system, but the desired action of penetration of the tines into the ground, the effective drive of the mechanism as a result thereof across the surface of the turf, and the penetration and retraction in a vertical straight line fashion to minimize turf deformation about the hole, is frustrated due to the drive system employed. Further, the machines discussed effect relative low velocity movement of the tines, minimizing the power application to the tines during the penetration and retraction process.

It is, therefore, a primary object of the present invention to provide an improved self-propelled lawn aeration machine which is of simplified construction, utilizes a single chain driven wheel to effect rotation of a series or sets of upper and lower wheels connected by jack shafts which, in turn, bear the tines under conditions in which the timing of the tine penetration and retraction from the ground may be readily varied, and wherein tine movement into and out of the ground perpendicular thereto is assured.

SUMMARY OF THE INVENTION

The invention is principally directed to a light weight, compact self-propelled lawn aeration machine which includes a generally horizontal chassis platform, an internal combustion engine mounted on the platform, and at least one tine support and drive mechanism mounted to the platform and operatively coupled to the engine. The tine support and drive mechanism includes a plurality of tines for cyclic movement downwardly of the platform to effect penetration of the underlying turf for aeration thereof and retraction therefrom. The improvement resides in means for fixedly mounting upper and lower vertically spaced hollow cylindrical wheel mounting journals to the platform with their axes horizontal, a shaft rotatably mounted within each journal and protruding to each side thereof, a first wheel rigidly fixed to the end of each shaft and a second wheel removably mounted to the other end of the shaft such that upper and lower wheels are mounted to opposite sides of the wheel mounting journals. The wheels have a plurality of holes at uniformly circumferentially spaced positions at equal radial positions outwardly of the wheel axis. A hollow cylindrical jack shaft journal is provided for each of the wheels. Bolt and nut means rotatably mount a jack shaft journal at a given one of the holes of each wheel. A jack shaft is fixedly connected between and joins the jack shaft journals of each set of wheels. The jack shaft journals of one wheel set are bolt connected to holes within the set of wheels angularly offset, less than 180 degrees from the jack shaft journals mounted to holes of the other wheel set, such that the wheels are kept in time by the jack shafts and the timing and direction of rotation of the wheel sets are determined by the direction and degree of angular offset of the jack shafts. Tines are fixedly mounted to the jack shaft journals of the lower wheels of both sets and project downwardly and in line with the jack shafts adjoining the jack shaft journals of each wheel set. As such, the tines enter and leave the turf perpendicular to the ground. Only one tine enters the turf at a time, and machine propulsion is automatically effected as a result of driving of the tines into the turf and retraction therefrom. Further, the timing of penetration of the tines into the turf and retraction therefrom may be readily varied by selectively changing the angular position of the jack shaft journals of one wheel set relative to that of the other wheel set for the at least one mechanism.

The lower wheel of one of the wheel sets for the at least one tine support and drive mechanism may comprise a sprocket wheel, and the machine further comprises drive means including a drive sprocket operatively coupled to the internal combustion engine and a chain linking the drive sprocket and that sprocket wheel. The at least one tine support and drive mechanism may comprise two mechanisms mounted laterally side by side on the platform. The internal combustion engine may be mounted to the end of the platform remote from the two tine support and drive mechainsms, and a pair of metal risers fixed to the platform and extending generally at right angles thereto, and generally vertically upward and parallel to each other, act to mount at least one of the wheel mounting journals. A main drive shaft extends horizontally across the risers, and means are provided for rotatably mounting the drive shaft to the risers for rotation about its axis. The internal combustion engine has a drive shaft parallel to the main drive shaft. V-pulleys are fixedly mounted to the internal combustion engine shaft and the main drive shaft, respectively, and means are provided for adjustably mounting an idler pulley on the platform. An endless belt is trained over the pulleys to effect drive from the internal combustion engine to the pulley mounted to the main drive shaft. A pair of drive sprockets are mounted to the main drive shaft in line with a lower wheel of each of the tine support and drive mechanisms with that lower wheel constituting a sprocket wheel. An endless chain engages the drive sprockets and the lower sprocket wheel of each of the mechanisms. The sides of the drive sprockets and the sprocket wheels are such that the sprocket wheels rotate at high speed and function as highly effective flywheels to maximize the force tending to drive the tines into the turf and remove the same and to improve machine self-propulsion resulting from sequential tine penetration into the turf and retraction therefrom. The holes within each of the wheels may be circumferentially spaced at 90 degrees to each, 60 degrees to each other, 45 degrees to each other, or a combination of the same.

Hollow tubular members may be fixedly connected to the jack shaft journals of the lower wheels of each wheel set, which hollow tubular members project radially therefrom in line with the axis of the jack shaft connecting the jack shaft journals of the upper and lower wheels of the set with the hollow tubes being threaded internally. The tines may each comprise a U-shaped metal plate welded at one end to a threaded stud projecting internally of the U-shaped plate with the threaded stud being threadably received by the internally threaded tube. A nut carried by the threaded stud and a lug washer on the threaded stud between the nut and the end of the threaded stud permits the tine to be shifted axially relative to the tube and fixed at the axially adjusted position. The U-shaped plate preferably terminates at its end remote from the threaded stud in an oblique cutting edge. Further, the corners where the oblique cutting edge meets the side edges of the U-shaped plate defining a narrow slot between those side edges are pinched in such that the effective cross-section of the hollow tine where it initially penetrates the turf is less than the cross-section of the hollow tine above the pinched in corners, facilitating the release of a plug created by penetration of the tine into the turf, with the slot within the U-shaped tine plate above the pinched in corners permitting a plug to be ejected from the tine during subsequent repenetration into the turf and the creation of a new plug. Preferably, the threaded stud internally of the U-shaped plate is obliquely beveled to cam the plug outwardly of the tine through the slot as the plug moves axially within the hollow tine in the direction of the threaded stud.

DESCRIPTION OF THE PREFERRED EMBODMENT

Figures 1, 5:
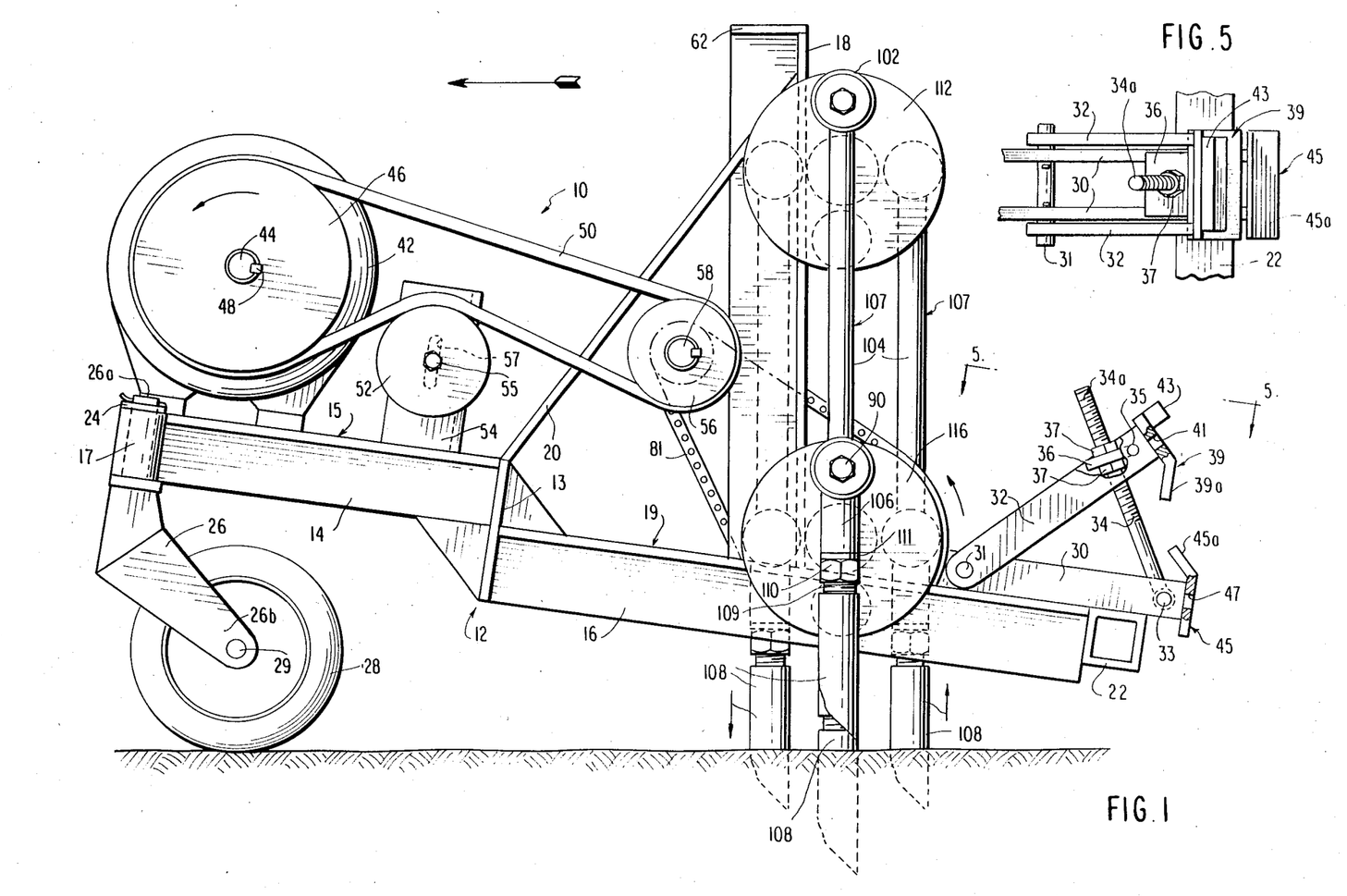
FIG. 1 is side elevational view of the principal components of the self-propelled lawn aeration machine forming a preferred embodiment of the present invention.
FIG. 5 is a top plan view of a depth adjustment mechanism for the machine of FIG. 1.
Figure 2:
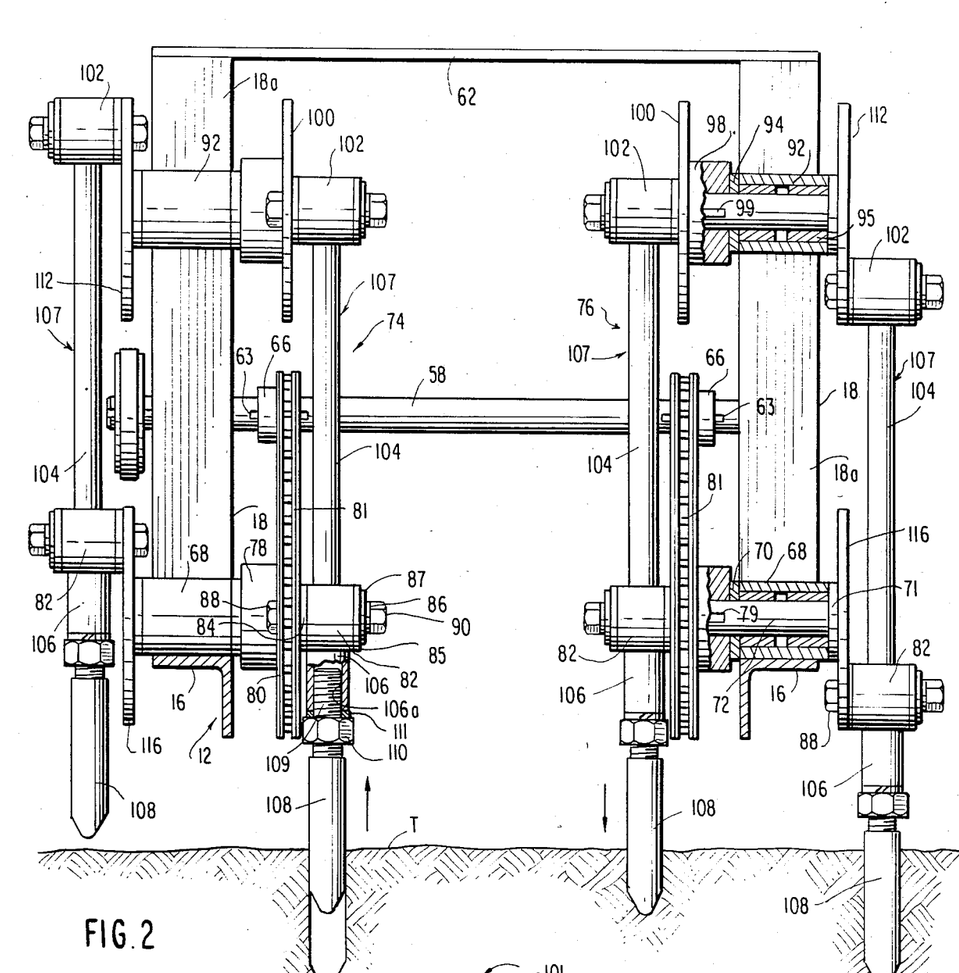
FIG. 2 is a vertical sectional view of the machine of FIG. 1.
Figures 6, 7, 8A, 8B:
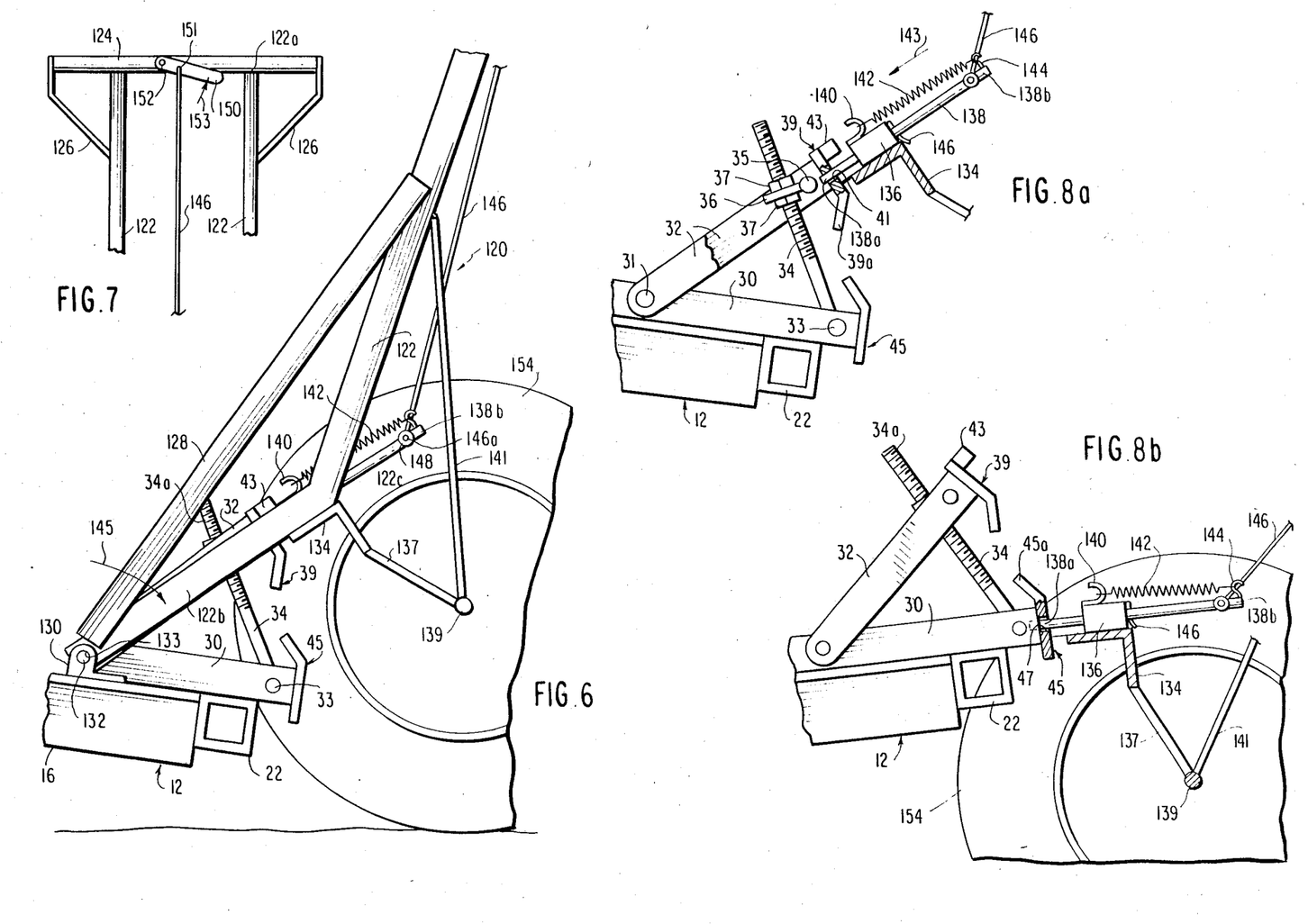
FIG. 6 is a side elevational view of a rear portion of the machine of FIG. 1, with the handle locked in raised position permitting tine penetration into the turf.
FIG. 7 is a front elevational view of the hand grip end of the handle assembly, partially shown in FIG. 6.
FIG. 8a is a side elevational view of the elements of the depth adjustment assembly with the handle in the position of FIG. 6.
FIG. 8b is a side elevational view, partially broken away, of the depth adjustment assembly as shown in FIG. 8a, with the handle locked in a lowered position and with the tines raised above turf penetration position.

Referring initially to FIGS. 1 and 2, the self-propelled lawn aeration machine, indicated generally at 10, comprises a wheeled frame or chassis, indicated generally at 12, bearing the components of the machine. A pair of vertically offset angle bars 14, 16 are provided on each side of the machine which are welded together via plates 13. Crossbars 17, 22 are welded across the ends of angle bars 14, 16, respectively, at the front and rear of chassis 12. Generally vertical risers 18 are welded to angle bars 16 and are joined by a crossbar 62 at the tops of risers 18. Crossbar 22 is of hollow rectangular cross-section. Crossbar 17 is welded across and joined at its end to angle bars 14 at the front of the machine chassis 12. Journals 24 to each side of the frame 12 receive the pintels 26a of forks 26 which, in turn, rotatably mount front wheels 28 via axles 29, the axles being mounted to the lower ends 26b of the forks 26. Angle bars 14 define a front platform 15 upon which is mounted a small internal combustion engine 42. To the rear of the frame 12, on rear platform 19, a pair of bars 30 welded to rear platform 19 function to support by pivotable connecting pins 31, 33, a pair of depth adjustment lock bars 32, and depth adjustment rod 34, respectively. Pivoted to the depth adjustment lock bars 32 adjacent its end remote from pin 33, via pin 35, is a latch adjustment plate 36 which is apertured so as to receive the threaded projecting end 34a of the depth adjustment rod 34 and permitting by shifting of the latch adjustment plate 36 on rod 34 angular adjustment of the depth adjustment lock bars 32. Nuts 37 are threaded to threaded end 34a of rod 34, to respective sides of latch adjustment plate 36, to maintain the depth adjustment lock bars 32 at a predetermined height above bars 30 and at a given angular position with respect to the lower pair of bars 30. Welded across the ends of depth adjustment lock bars 32 is a first pin locking plate 39 which terminates at its lower end in an angularly bent camming portion 39a. A transverse elongated slot or recess 41 is formed within latch plate 39. Above slot 41, there is welded to the outside face of the locking plate 39, a rectangular block or stop 43 which acts, as best seen in FIG. 8a, as a stop for limiting pivoting of handle assembly frame member portions 122b beyond a position generally in line with the pair of depth adjustment lock bars 32.

In similar fashion a second pin locking plate 45 is welded across the end of paired bars 30 which second or lower locking plate 45 terminates at its upper end in an oblique, forwardly bent camming portion 45a. Further, an elongated transverse slot 47, similar to that at 41, is formed within the lower locking plate 45.

The two frame risers 18, on opposite sides of frame 12, and the crossbar 62 welded thereto at the top provide a relatively rigid support structure for the mechanisms which both support and drive a plurality of turf plug tines 108. Inclined struts or reinforcing plates 20 welded to angle bars 14 and risers 18 further strengthen the risers 18. To effect that drive, the internal combustion engine 42 has coupled to an output shaft 44, a relatively large diameter V-type drive pulley 46, by way of key 48. Mounted to and extending between the frame risers 18 is a main drive shaft 58 which extends transversely across the machine, above frame rear platform 19. To the left side of the machine 10, shaft 58 carries a relatively small diameter V-pulley 56. An endless belt 50 is trained about V-pulleys 46, 56 and passes over an idler pulley 52. The idler pulley 52 is vertically adjustably mounted on a support block 54 which rises upwardly from and is fixed to front platform 15. The support block 54 is provided with an elongated slot 57 through which projects adjustment bolt 55 on which mounts the idler pulley 52. As such, the idler pulley 52 can be raised or lowered and fixed at a vertically adjusted position to provide the requisite tension to the drive belt 50.

By reference particularly to FIG. 2, it is seen that the main drive shaft 58, which is supported for rotation about its axis by trunions fixed to risers 18, has keyed by way of keys 63 a pair of sprockets 66 whose integral hubs 64 facilitate that mechanical connection to the drive shaft 58. As such, the sprockets 66 form components of left and right multiple tine support and drive mechanisms 74, 76, respectively, to effect, automatically, high speed plug removal and self-drive of the machine across turf T, from which turf plugs are removed.

Mechanisms 74 and 76 are mirror images of each other, and like elements bear like numerical designations. In that respect, to each side of the machine the angle bars 16 have fixedly mounted thereto, as by being welded, hollow cylindrical metal journals 68, within which are mounted shafts 72 via dual, opposed bearing halves 70, 71. It should be appreciated that each tine support and drive mechanism 74, 76, comprises four wheels. A primary or drive wheel 80, which constitutes a sprocket wheel, in that teeth are provided on its periphery, is connected via an endless chain 81 to a drive sprocket 66 fixed to the main drive shaft 58. In line with lower wheel 80 is a further wheel 100 constituting the upper wheel of a first wheel set involving wheels 80, 100. To the opposite side of journal 68, a second lower wheel 116 is provided for each mechanism which is in line with and is mechanically coupled to an upper wheel 112, to that side, and forming a second set of wheels therewith, similar to a set of wheels 80, 100 to the machine inside of journal 68.

Sprocket wheel 80 is provided with an integral hub 78 which hub is keyed to shaft 72 via key 79. Integrally formed with shaft 72, to the outside of the frame 12, is the other lower wheel 116 of each assembly 74, 76. All four wheels 80, 100, 112 and 116 are of equal diameter. Further, the wheels are all supplied with a number of circumferentially spaced holes. In the illustrated embodiment, holes 101, are provided 90 degrees apart and 60 degrees apart, as seen best in FIG. 3 to facilitate and permit the adjustable mechanical coupling between the upper and lower wheels of a given wheel set in the vertical plane. Wheels 112 and 116 of the left side drive mechanism 74 as shown, in FIG. 1, with a similar number of holes 101, although all four wheels of both mechanisms 74, 76 are identically provided to permit the flexibility and adjustability desired.

In addition to lower journal 68, for each mechanism 74 and 76, there is provided an upper journal as at 92 in the form of a hollow metal cylinder which is likewise welded or otherwise suitably fixedly mounted to face 18a of riser 18. It rotatably mounts a shaft 96, similarly sized and configured, to shaft 72 for the lower wheels 80, 116. Additionally, it receives paired oppositely directed bearing halves 94, 95, such that shaft 96 freely rotates about its axis coaxial with journal 92. In similar fashion, the upper wheel 112 is integral with shaft 96, at one end, while wheel 100 via its hub 98 is keyed as at 99 to shaft 96, after shaft 96 is projected through bearings 94.

An important aspect of the present invention, in addition to the fact that the machine is formed of components which may be readily changed, i.e. the wheels 100, 80, 100, 112 and 116 may be replaced by other wheels having differently numbered mounting holes 101 passing through the same, at different circumferentially spaced positions, thus effecting a change in the timing sequence and the speed of movement of the machine across the turf to remove plugs therefrom, as will be described hereinafter.

As mentioned previously, only wheels 80 of both mechanisms 74, 76 are positively driven via drive chains 81. Wheels 116 are shaft driven in unison therewith. However, the upper wheels 100, 112 of respective mechanisms 74, 76 are both driven and kept in time by jack shafts 104 which mechanically connect a given upper wheel to a lower wheel in line therewith for respective mechanisms. The pivot mounting mechanisms at both ends of the jack shafts 104 are the same and interchangeable. In that respect, one of the key aspects of each of the mechanisms 74, 76 is the content of duplicate jack shaft assemblies, indicated generally at 107, which function to effectively mount the individual tines 108 to vertically in line, paired, upper and lower wheels to the inside and to the outside of frame angle bars 16, respectively. Each jack shaft assembly 107 is comprised of a jack shaft 104 having welded at its upper end hollow, cylindrical journal 102 and at its lower end hollow, cylindrical journal 82. Diametrically opposite the weld connection of the lower end of jack rod 104 to journal 82, there is welded to that journal and projecting in axial alignment with jack shaft 104, a hollow metal tube 106 which is threaded at 106a on its inner periphery. Threadably coupled to the interior of tube 106 is threaded stud 109 forming a mounting component of each tine 108 to which stud 109 is welded. The threaded stud 109 supports a nut 110, backed by lock washer 111, which locks down onto the end of tube 106 to effectively lock the tine 108 in an axially adjustable position relative to tube 106 which bears the threaded end of the same. The mounting of both journals 82 and 102 to respective wheel sets 80, 100, and 116, 112, for each mechanism 74, 76, as an example, is achieved utilizing a bolt 88, passing through the journals and through paired, opposed bearing halves. The bearing halves 84, 85 are very similar to the bearing halves 70, 71 for mounting of shaft 72 and its counterparts at 94, 95, for shaft 96, in each of the mechanisms 74, 76. In that respect, the bearing halves 70, 71, 94, 95, and 84, 85 are T-shaped in cross-section with flanged ends terminating flush with the outer periphery of the journals bearing the same. With bearing halves 84, 85 in place, a flat washer 87 is positioned against the flanged end of the bearing half 84, a lock washer 86 is interposed between nut 90 and the flat washer 87, and the nut 90 is tightened down on the threaded end of bolt 88, which bolt projects through a given hole 101 within each wheel 80. The same arrangement is employed with respect to mounting of the ends of the jack shafts 104 to wheels 80 and 116 via journals 82, and wheels 100, 112, via journals 102, respectively. The mounting arrangement employed for all four jack shaft assemblies 107 for both mechanisms 74 and 76 effects an easily demountable and changeable assembly as schematically illustrated in FIG. 3.

Figures 3, 4:
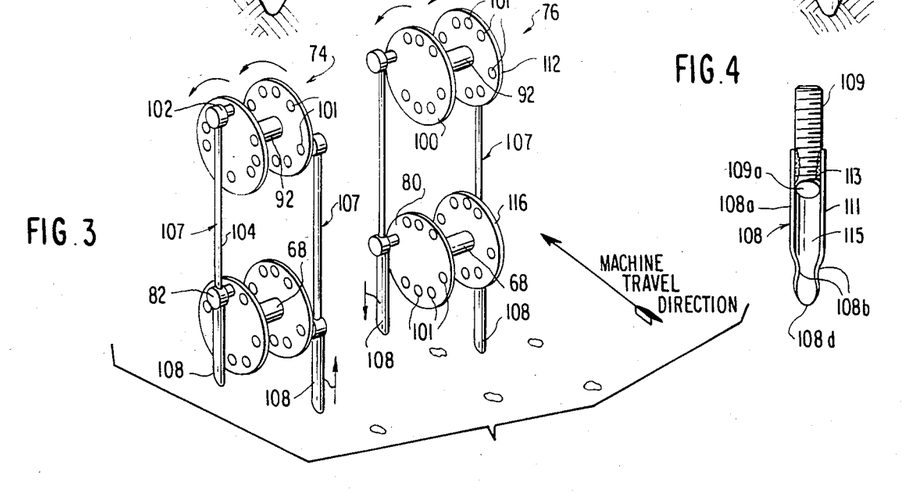
FIG. 3 is a perspective view of the tine mounting and driving system of the machine shown in FIGS. 1 and 2.
FIG. 4 is a front elevational view of one of the tines employed in the machine of FIGS. 1 and 2.

Purposely in FIG. 3, only the jack shaft assemblies 101 and the four wheels 80, 100, 112 and 118 are schematically illustrated for the mechanisms 74, 76, and under conditions in which the timing sequence for the projection and retraction are effected so that there is normally only one tine entering the ground at a time. The machine 10 moves forward in the direction of the arrow at a relatively high rate of speed, and the tines 108 are driven into the ground and removed under maximum power application conditions for the simplified driven system of the present invention.

Keeping in mind that only the inside lower, sprocket wheels 80 of the mechanism are positively driven via chains 81 through drive shaft 58, as may be appreciated, the connection between the lower wheels and the upper wheels of both sets for the left and right side drive mechanism 74, 76 are solely effected via the jack shaft assemblies 107. The upper wheel 100, vertically in line with lower wheel 80, for each mechanism, knows via the jack shaft 107 that is to be driven but has no knowledge of which way to turn when journals 82, for instance, are at their bottom dead center position during rotation about the axis of shafts 72. However, under the timing mechanism created by this assembly, the journals for the jack shaft assemblies 107 connecting paired upper and lower wheels 112, 116 for each of the mechanisms 74, 76 are angularly offset from journals 82, 100 for the other wheel set, i.e. wheels 80, 100. As such, as indiciated, given clockwise rotation for wheels 80, looking left to right, FIG. 3, the upper wheels 100, 112 for both mechanisms 74, 76 will have to rotate and be driven in unison in a counterclockwise direction as shown by the arrows in FIG. 3, for both mechanisms 74, 76.

Additionally, as may be appreciated, the tines 108 enter and leave the turf under conditions in which they are perpendicular at the moment of penetration, at the moment of extraction, and throughout the cycle. This is in contrast to the prior machines of the corporate assignee, in that, in those machines the tines enter at one angle relative to the perpendicular and leave at a different angle, causing further earth compaction. The pivot coupling of the ends of jack shaft 104 via journals 82, 102, respectively, for wheel sets 80, 100, is 90 degree angularly offset to the pivot connections for jack shaft 104 for wheel sets 116, 112 of the same mechanism.

In contrast to machines where power is directly applied to front or rear wheels, such power drive is eliminated by the present invention because the tines function to propel the machine forward, and the timing of penetration and removal of the tines is achieved by the use of a power driven main drive shaft 58 whose power is solely applied to a single one of the wheels, i.e. wheels 80 to the inside of the frame angle bars 16. As can be appreciated, that drive could be effected to the outer lower wheels 116, rather than inner lower wheels 80, by forming those wheels 11 as sprocked wheels in lieu of wheels 80 for each of the mechanisms 74, 76. The eccentric connection of the jack shaft assemblies 107 to the wheel sets provides an effective force application from driven shafts 72 to tines 108 in a downward and backward direction in relation to the movement of the machine. This drives the tines 108 into the ground and removes them in a straight up/down motion which effectively propels the machine forward. The straight up and down motion eliminates any waddle in the hole which is characteristic of prior machines additionally compacting the sidewalls of the hole during the formation of the plug by the hollow tine 108.

Each tine 108, as shown in FIG. 4, is characterized by forming the tine from a flat plate 111 which is bent into U-shaped cross-sectional configuration, forming a vertical slot 115, and wherein the corners 108b at the intersection of side edges 108a with inclined bottom edge 108d are tucked in towards each other to reduce the cross-sectional area of the hollow tine at its entry or cutting edge 108d with an enlargement in the direction of the threaded stud 109 welded thereto at 113, to facilitate fallout of the plug (not shown) when the tine is retracted from the turf T. The ends 109a of the studs are beveled to cam the plug out of the hollow tine 108 via slot 108a. The machine with these tines 108 is not typical of golf course greens machines but is used on lawns, parks, etc. where the plugs are left on the lawn or turf since they increase the microbio activity to help decompose the remaining thatch.

As may be appreciated, the throw or distance from the axis of the shafts 72, 96 and the axis of holes 101 within all four wheels of each mechanism 74, 76, and thus the axis of the cylindrical journals 82, 92, 114, 118, may vary. Typically, that throw may amount to $1\frac{7}{8}$ inches. Due to the circular rotation of the wheels 80, 118, 100, 112, the tine penetration is also on the order of $1\frac{7}{8}$ inches because when the tine 108 is in the top half of its swing, the tine 108 is going in the same direction as the machine 10 and has a forward motion and theoretically, a penetration of $3\frac{3}{4}$ inches, and the tine should be going in the same direction as the machine with a forward motion of $3\frac{3}{4}$ inches. In actual practice, the tines achieve three inch penetration with a three inch forward motion without tearing the turf T or elongation of the hole H, FIG. 2.

By using an elongated slot 111 within the tine 108, the slot can open and close and thus is capable of pinching the soil to facilitate retraction. Additionally, with the pinched in corners 108b, the plug which is necessarily reduced during turf penetration can expand somewhat as well as leave the large U-shaped slot opening above the cutting edge 108d and the pinched in area, this action not being present where a solid tube is employed which has been crimped smaller on the bottom. The presence of the slot is quite effective along with the crimping at the corner where the oblique cutting edge 108d meets the vertical edges 108a of the U-shaped plate 111 forming the main component of the tine.

As may be appreciated, while the upper end of the U-shaped plate 111 is welded to threaded stud 109 of tine 108, other arrangements may be made to create a tine corresponding in configuration and make up to that illustrated in FIG. 4.

In setting up the left and right side mechanisms 74, 76, with the extreme left tine up, one of the center tines must be up and one must be down. A rod (not shown) may be inserted through aligned holes 101 within bottom wheels 118, 80, 80 and 118, from left to right, FIG. 3. The inserted end of the rod should touch the center of the bolt head of bolt 88 passing through journal 116 of the right side tine. When this rod is parallel to the machine frame 12, the machine 10 is correctly timed for chain replacement, bearing replacement, etc. Such maintenance of timing sequence is necessary due to the fact that the elements of the mechanisms 74, 76 are built up and installed under conditions requiring exact positioning and alignment to insure the initial creation of proper timing and the maintenance of the same.

The rotational direction of wheels 80 should be rotating in a counterclockwise direction when viewed from left to right, FIG. 3.

It should be appreciated, that the upper wheels 100, 112 for each mechanism 74, 76 are maintained in time by offsetting the connection links for the jack shaft assemblies 107 to respective wheels 100, 112 by some angular offset, up to but not including 180 degrees. The illustrated embodiment shows 90 degree offset since there are four jack shaft assemblies forming connecting links between the four upper and lower, in line sets of wheels. If the machine is widened, utilizing two additional jack shaft assemblies, one to each side, the offset of the throws may be by 45 degrees rather than 90 degrees by using a different pattern of holes 101, 45 degrees apart. Additional holes 101, other than those at 90 degrees as at 45 degrees, 60 degrees, etc., may be added to the wheels shown to provide for this circular effect. If the number of tines were doubled to eight, four to a side, it would be necessary to return to the 90 degree offset, or alternatively, a series of 45 degree offset holes would suffice. It should be additionally appreciated that the lower wheel of each mechanism 74, 76 are driven at relatively high speed by the proper selection of pulley, sprocket and sprocket wheel diameters with the lower wheels 80 and 116 for each of the mechanisms 74, 76 constituting highly effective high speed flywheels, providing more than adequate force for penetrating the hollow tines 108 into the turf and retraction therefrom in timed sequence, even when the turf is relatively dry and hard under conditions in which the operation insures that action at high speed with self-propulsion of the machine 10. Using the mechanisms 74, 76 as shown via the drive system of pulleys and sprocket wheels, the lower wheels 80, 108 of both left and right mechanisms rotate at 400 rpm. In the illustrated embodiment, one rpm advances the machine forward six inches by doubling the rpm from the 200 rpm of prior machines of the corporate assignee. The present invention increases appreciably the penetration force driving the tines 108 into the turf.

As may be appreciated by reference to FIGS. 1, 5, 6, 7 and 8a and 8b, the machine of the present invention utilizes a two position handle assembly for locking the handle in either raised or lowered position to permit tine penetration into the turf and plug removal, or prevent the same alternatively. With the handle assembly lowered relative to the rear end of the chassis, the effect is to raise the rear end of the chassis 12 and with the handle assembly locked in this position, the chassis 12 may be pushed across the turf rotating on its front and rear wheels.

The adjustable locking of the handle assembly may be appreciated further by reference to FIGS. 6, 7 and 8a, 8b. In FIG. 6, a handle assembly is indicated generally at 120 and is comprised of laterally spaced handle assembly frame members 122 which may be angle bars and terminating at their lower ends in sections 122b which are at an obtuse angle to the frame members 122 proper. The lower ends of the handle assembly frame members 122 are pivotably mounted to respective sides of the machine and specifically to chassis angle bars 16 by means of brackets 130 welded to the angle bars 16, within which pivot pins 132. Pins 132 are fixed to the ends 122b of handle assembly frame members 122 and rotate within holes 133 of the brackets 130, through which the pins project. Alternative means may be employed. However, it is important that the pivot axis for handle assembly frame members 122 be in general alignment with the pivot axis for the paired depth adjustment lock bars 32. Reinforcing struts 128 may be welded at respective ends to portions of the handle assembly frame members 122 spanning the bend area 122c of those frame members. Further, angle arm or transverse cross bar 134 is welded at respective ends to the laterally opposed handle assembly frame members 122. The handle assembly 120 has welded, across those upper ends 122a of the frame members 122, a handle bar 124. Preferably, a pair of struts 126 are, in turn, welded at one end to the ends of the handle bars 124 and at opposite ends to the sides of the handle assembly frame members 122. The cross bar or angle arm 134 mounts at its center, as best seen in FIGS. 8a, 8b, a metal sleeve or cylinder 136 which may be welded to the upper face of the angle bar 134 and through which passes a pin or plunger 138. A hole drilled transversely through pin 138 carries a cotter pin as at 146 to limit movement of the pin 138 in a direction towards chassis 12. A U-shaped hook 140 is welded to the outside of the sleeve or cylinder 136 and a hook 144 is fixed to the end 138b of the pin 138. A tension coil spring 142 is mounted at respective ends to hooks 140, 144, so as to bias the pin 138 in the direction of arrow 143, FIG. 8a.

As may be seen in FIG. 8a, under conditions where the pin 138 is within slot 41 of locking plate 39, handle assembly 120 is locked in raised position relative to chassis 12. The cross bar or angle arm 134 additionally mounts to opposite sides thereof rear wheel axle support bars 137 which are welded at one end to cross bar 134 and its opposite ends to an axle 139 for mounting paired rear wheels 154 to each side of the machine. A second pair of axles support bars 141 extend from axle 139, being welded thereto, at that end, directly to respective frame members 122 and are welded at their upper ends to frame members 122. A rigid axle mount is thus provided for the handle assembly 120. The handle assembly 120 further includes a pin release mechanism which consists of a wire control rod 146. Rod 146 terminates in a right angle portion 146a at its lower end which projects through a hole within pin 138 at end 138b beyond the cotter pin 146. After passing through the hole within pin 138, a washer 148 is mounted thereto and the end 146a of the control rod may be peened over to complete the coupling. The opposite end of the control rod 146 is bent at right angles thereto, and projects within a hole 151 of an operating lever 150. Lever 150 is pivot mounted by a pin 152 projecting from the handle bar 124 such that rotation of the lever 150, as shown by arrow 153, in a counterclockwise direction, FIG. 7, functions to retract the pin 138 against the bias of coil spring 142 and to remove the pin end 138a from slot 41 of latch plate 39, FIG. 8a, or to remove the end 138a of the pin 138 from a similar slot 47 within the lower locking plate 45, FIG. 8b. Coil spring 142 normally biases the pin in projected, rather than retracted, position. During changeover from the tine penetration and chassis lowered position, as shown in FIGS. 1 and 6, to a tine retracted and chassis raised position, all that is necessary is that an initial movement be given to lever 150 in a counterclockwise direction as shown by arrow 153 in FIG. 7, at which point the handle assembly frame members 122 can pivot clockwise, FIG. 6, as indicated by arrow 145. Upon releasing of the lever 150, pin 138 again moves forwardly within cylinder or sleeve 136 under the bias of coil spring 142. The end 138a of the pin 138, in moving towards locking plate 45, will strike the camming portion 45a of locking plate 45, causing the pin 138 to retract against the bias of coil spring 142 until the end 138a of the pin 138 reaches transverse slot 47, whereupon the spring bias causes it to project into the slot to lock the lower ends 122b of the handle assembly frame members 122 generally in line with the paired bars 30. The effect of this is to raise all of the tines 108 above the turf and prevent their penetration, even with the engine operating.

To again effect turf penetration, the lever 150 must be pivoted counterclockwise, FIG. 7, removing end 138a of pin 138 from slot 47 within the lower locking plate 45. This permits the handle assembly 120 to rotate counterclockwise to the position shown in FIG. 6, whereupon, in so moving, the end 138a of pin 138 (with lever 150 released) contacts the angled camming portion 39a of the locking plate 39, forcing the pin 138 to retract against the bias of spring 142 which is stretched during this action to the point where the end 138a of the plunger 138 rides across the face of latch plate 39 until it reaches the transverse slot 41, whereupon the end 138a of pin 138 projects into the slot under spring 142 bias.

It should also be kept in mind that the cross bar 134 is welded to the handle assembly frame members 122 at a position such that either it or the projected end 138a of pin 138 will impinge against the stop 43 to prevent further pivoting of the frame members 122 beyond a position where their lower ends 122b are essentially in line with the pair of depth adjustment lock bars 32. The degree of angulation between chassis raised and chassis lowered positions can be effectively changed, as mentioned previously, by rotation of the locking nuts 137 on the threaded end 34a of the depth adjustment rod 34 to permit the depth adjustment rod 34 to be adjusted within the hole within latch adjustment plate 36.

While the invention has been particularly shown and described with reference to a prefered embodiment thereof, it will be understood by those skilled in the art that various changes in form and details may be made therein without departing from the spirit and scope of the invention.

What is claimed is:

1. In a lightweight, compact self-propelled lawn aeration machine including:
   a generally horizontal chassis platform,
   an internal combustion engine mounted on said platform,
   at least one tine support and drive mechanism mounted to said platform,
   means operatively coupling said at least one mechanism to said engine,
   said at least one tine support and drive mechanism including a plurality of tines for cyclic movement downwardly of said platform to effect penetration of the underlying turf for aeration thereof and retraction therefrom,
   the improvement comprising:
   means for fixedly mounting upper and lower vertically spaced hollow cylindrical wheel mounting journals to said platform with their axes horizontal,
   a shaft rotatably mounted within each journal and protruding to each side thereof,
   a first wheel rigidly fixed to the end of each shaft,
   a second wheel removably mounted to the other end of each shaft; whereby, upper and lower wheels on opposite sides of the wheel mounting journals form wheel sets,
   said wheels having a plurality of holes at uniformly circumferentially spaced positions at equal radial positions outwardly of the wheel axis,
   a hollow cylindrical jack shaft journal for each of said wheels,
   bolt and nut means rotatably mounting a jack shaft journal at a given one of said holes of each wheel,
   a jack shaft fixedly connected between and joining said jack shaft journals of each set of wheels,
   said jack shaft journals of one wheel set being bolt connected to holes within that set of wheels angularly offset by less than 180 degrees from jack shaft journals mounted to wheel holes of the other wheel set, such that the wheels are kept in time by the jack shafts and the timing and direction of rotation of the wheels sets are determined by the direction and degree of the angular offset of the jack shafts, and tines fixedly mounted to the jack shaft journals of the lower wheels of both sets and projecting downwardly and in line with the jack shafts joining the jack shaft journals of each wheel set;

whereby, the tines enter and leave the turf perpendicular to the ground, only one tine may enter the turf at a time and machine propulsion is automatically effected as a result of driving of the tines into the turf and the retraction therefrom, and whereby the timing of penetration of the tines into the turf and retraction therefrom may be readily varied by selectively changing the angular position of the jack shaft journals of one wheel set relative to that of the other wheel set for said at least one mechanism.

2. The self-propelled lawn aeration machine as claimed in claim 1, wherein a lower wheel of one of said wheel sets for said at least one tine support and drive mechanism comprises a sprocket wheel, and said machine further comprises drive means including a drive sprocket operatively coupled to said internal combustion engine, and a chain linking said drive sprocket and said sprocket wheel.

3. The self-propelled lawn aeration machine as claimed in claim 1, wherein said at least one tine support and drive mechanism comprises two mechanisms mounted laterally side by side on said platform, said internal combustion engine is mounted to the end of said platform remote from said two tine support and drive mechanisms, a pair of metal risers are fixed to said platform and extend generally at right angles thereto and generally vertically upward and parallel to each other, at least one of said wheel mounting journals is welded to each of said risers, a main drive shaft extends horizontally across the risers, means are provided for rotatably mounting said main drive shaft to said risers for rotation about its axis, said internal combustion engine has an output shaft parallel to the main drive shaft, V pulleys are fixedly mounted to said internal combustion engine output shaft and said main drive shaft, respectively, means are provided for adjustably mounting an idler pulley on said platform, and an endless belt is trained over said pulleys to effect drive from said internal combustion engine to the pulley mounted to the main drive shaft, a pair of drive sprockets are mounted to said main drive shaft in line with a lower wheel of each of said tine support and drive mechanisms, the lower wheel constituting a sprocket wheel, an endless chain engages the drive sprockets and the lower sprocket wheel of each of said mechanisms, and wherein the size of said pulleys, said drive sprockets and said sprocket wheels are such that the sprocket wheels rotate at high speed and function as flywheels to maximize the force tending to drive the tines into the ground and remove the same to improve machine self-propulsion resulting from sequential tine penetration into the ground and retraction therefrom.

4. The self-propelled lawn aeration machine as claimed in claim 3, wherein said holes within each of said wheels are circumferentially spaced at 90 degrees to each other.

5. The self-propelled lawn aeration machine as claimed in claim 4, wherein said circumferentially spaced holes comprise holes spaced 90 degrees to each other and holes spaced 60 degrees to each other.

6. The self-propelled lawn aeration machine as claimed in claim 1, wherein hollow tubular members are fixedly connected to the jack shaft journals of the lower wheels of each wheel set and project radially therefrom in line with the axis of the jack shaft connecting the jack shaft journals of the upper and lower wheels of said set, said hollow tubes are threaded internally, and wherein said tines each comprise a U-shaped metal plate welded at one end to a threaded stud projecting internally of said plate, said threaded stud being threadably received by said internally threaded tube, a nut carried by said stud, a lock washer on said threaded stud between said nut and the free end of said threaded stud, such that the tine can be shifted axially relative to the tube and fixed at said axially adjusted position.

7. The self-propelled lawn aeration machine as claimed in claim 6, wherein said U-shaped plate terminates at its end remote from said threaded stud in an oblique cutting edge, and wherein corners where the oblique cutting edge meets side edges of said U-shaped plate defining a narrow slot between the plate side edges are pinched in, such that the effective cross-section of the hollow tine where it initially penetrates the turf is less than the cross-section of the hollow tine above the pinched in corners facilitating the release of a plug created by penetration of the tine into the turf, with the slot within the U-shaped tine plate above the pinched in corners permiting a plug to be ejected from the hollow tine during subsequent repenetration of the hollow tine into the turf and the creation of a new plug.

8. The self-propelled lawn aeration machine as claimed in claim 7, wherein the end of the threaded stud welded to said U-shaped plate is cut diagonally correspondingly to the angle of the oblique cutting edge such that the oblique end of the threaded stud acts as a cam to drive the plug created by penetration of the tine into the turf from said hollow tine through said elongated slot.

* * * * *